United States Patent [19]

Fujita

[11] Patent Number: 4,914,730
[45] Date of Patent: Apr. 3, 1990

[54] DISPLAY DEVICE HAVING PLURAL GROUPS OF INTERCONNECTED SEGMENT ELECTRODES

[75] Inventor: Masanori Fujita, Tokyo, Japan
[73] Assignee: Seikosha Co., Ltd., Japan
[21] Appl. No.: 478,886
[22] Filed: Mar. 25, 1983

[30] Foreign Application Priority Data

Apr. 2, 1982 [JP] Japan .................................. 57-55867

[51] Int. Cl.⁴ .............................................. G09G 3/00
[52] U.S. Cl. ................................................... 340/756
[58] Field of Search ............... 340/765, 775, 784, 789, 340/790, 782, 799, 800, 793, 814, 754, 753; 350/332

[56] References Cited

U.S. PATENT DOCUMENTS

| | | | |
|---|---|---|---|
| 4,099,073 | 7/1978 | Hashimoto | 340/805 |
| 4,113,361 | 9/1978 | Nakano | 340/765 |
| 4,119,367 | 10/1978 | Raynes | 340/805 |
| 4,121,203 | 10/1978 | Edwards | 340/805 |
| 4,142,182 | 2/1979 | Kmetz | 350/332 |
| 4,250,503 | 2/1981 | Shanks | 340/805 |
| 4,308,534 | 12/1981 | Yamamoto | 340/784 |
| 4,429,304 | 1/1984 | Fujita | 340/805 |

FOREIGN PATENT DOCUMENTS 1596705 8/1981 United Kingdom .

OTHER PUBLICATIONS

Twisted Nematics Displays for Multiplexing, Allan Kmetz, SID 76 Digest, p. 36.

Primary Examiner—Gerald Brigance
Attorney, Agent, or Firm—Bruce L. Adams; Van C. Wilks

[57] ABSTRACT

Segment groups each comprising at most three segments are rendered free of the display mode in which two out of the three segments in each respective group are rendered unresponsive and the remaining segment responsive, and segment electrodes of these three segments being electrically interconnected and disposed in confronting relation to different common electrodes for being driven by supplied voltages. The display device of such a construction has a high operational margin, can be operated in a wide temperature range, and has a high display contrast and high response speed.

10 Claims, 6 Drawing Sheets

|   | a | b | c | d | e | f | g | p |
|---|---|---|---|---|---|---|---|---|
| 0 | O | O | O | O | O | O | x | x / o |
| 1 | x | O | O | x | x | x | x | x / o |
| 2 | O | O | x | O | O | x | O | x / o |
| 3 | O | O | O | O | x | x | O | x / o |
| 4 | x | O | O | x | x | O | O | x / o |
| 5 | O | x | O | O | x | O | O | x / o |
| 6 | O | x | O | O | O | O | O | x / o |
| 7 | O | O | O | x | x | x | x | x / o |
| 8 | O | O | O | O | O | O | O | x / o |
| 9 | O | O | O | O | x | O | O | x / o |

O; Response   x; Unresponse

| COMMON ELECTRODE / SEGMENT ELECTRODE | COM 1 $C_1$ V 3V 3V 3V V V | COM 2 $C_2$ 3V V 3V V 3V V | COM 3 $C_3$ 3V 3V V V V 3V |
|---|---|---|---|
| $S_1$ 0 4V 4V 4V 0 0 | × V -V -V -V V V | ○ 3V 3V -V -V -3V V | ○ 3V -V -3V -3V V 3V |
| $S_2$ 4V 0 4V 0 4V 0 | ○ 3V 3V -V 3V -3V V | × -V V -V V -V V | ○ -V 3V -3V -3V 3V 3V |
| $S_3$ 4V 4V 0 0 0 4V | ○ -3V -V 3V 3V V -3V | ○ -V -3V 3V V 3V -3V | × -V -V V V V -V |
| $S_4$ 2V 2V 2V 2V 2V 2V | × -V V V V -V -V | × V -V V -V V -V | × V V -V -V -V V |
| $S_5$ 0 0 0 4V 4V 4V | ○ V 3V 3V -V -3V 3V | ○ V V 3V -3V -V 3V | ○ 3V 3V V V -3V -3V -V |

Fig.5

| | | a (C1) | b (C2) | c (C3) | | f (C1) | g (C2) | d (C3) | | — (C1) | e (C2) | p (C3) |
|---|---|---|---|---|---|---|---|---|---|---|---|---|
| 0 | S5 | O | O | O | S2 | O | x | O | S5,1 / S3 | — | O / O | O / x |
| 1 | S1 | x | O | O | S4 | x | x | x | S2 / S4 | — | x / x | O / x |
| 2 | S3 | O | O | x | S1 | x | O | O | S5,1 / S3 | — | O / O | O / x |
| 3 | S5 | O | O | O | S1 | x | O | O | S2 / S4 | — | x / x | O / x |
| 4 | S1 | x | O | O | S3 | O | O | x | S2 / S4 | — | x / x | O / x |
| 5 | S2 | O | x | O | S5 | O | O | O | S2 / S4 | — | x / x | O / x |
| 6 | S2 | O | x | O | S5 | O | O | O | S5,1 / S3 | — | O / O | O / x |
| 7 | S5 | O | O | O | S4 | x | x | x | S2 / S4 | — | x / x | O / x |
| 8 | S5 | O | O | O | S5 | O | O | O | S5,1 / S3 | — | O / O | O / x |
| 9 | S5 | O | O | O | S5 | O | O | O | S2 / S4 | — | x / x | O / x |

| | | i (C1) | j (C2) | k (C3) | | m (C1) | n (C2) | ℓ (C3) | | — (C1) | q (C2) | r (C3) | | h (C1) | o (C2) | — (C3) |
|---|---|---|---|---|---|---|---|---|---|---|---|---|---|---|---|---|
| 5 | S1 | x | o | o | S3 | o | o | x | S4 | — | x | x | S2 | o | x | — |
| 177 | S3 | o | o | x | S2 | o | x | o | S3 | — | o | x | S5,3 | o | o | — |
| 7 | S4 | x | x | x | S2 | o | x | o | S4 | — | x | x | S5,3 | o | o | — |
| LU | S5 | o | o | o | S2 | o | x | o | S5,1 | — | o | o | S4 | x | x | — |
| F | S4 | x | x | x | S5 | o | o | o | S4 | — | x | x | S2 | o | x | — |

| | | v (C1) | w (C2) | u (C3) | | — (C1) | s (C2) | t (C3) |
|---|---|---|---|---|---|---|---|---|
| U | S2 | o | x | o | S2 | — | x | o |
| Ci | S2 | o | x | o | S5,1 | — | o | o |
| E | S5 | o | o | o | S3 | — | o | x |
| H | S3 | o | o | x | S2 | — | x | o |
| F | S3 | o | o | x | S5,1 | — | o | o |

| SEGMENT ELECTRODE \ COMMON ELECTRODE | V 0 0 0 V 2 V 2 V 2 V | 0 V 0 0 2 V V 2 V 2 V | 0 0 V 0 2 V 2 V V 2 V |
|---|---|---|---|
| 2V 0 0 0 0 2V 2V 2V | X<br>V0 0 0  V 0 0 0 | O<br>2V V 0 0 2 V  V 0 0 | O<br>2V 0 V 0 2V 0 V 0 |
| 0 2V 0 0 2V 0 2V 2V | O<br>V 2V 0 0  V 2V 0 0 | X<br>0  V 0 0 0  V 0 0 | O<br>0 2V V 0 0 2V  V 0 |
| 0 0 2V 0 2V 2V V 0 2V | O<br>V 0  2V 0  V 0 2V 0 | O<br>0 V  2V 0 0  V 2V 0 | X<br>0 0  V 0 0 0  V 0 |
| 0 0 0 0 2V 2V 2V 2V | X<br>V 0 0 0  V 0 0 0 | X<br>0 V 0 0 0  V 0 0 | X<br>0 0  V 0 0 0  V 0 |
| 0 0 0 2V 2V 2V 2V 0 | O<br>V 0 0 2V  V 0 0 2V | O<br>0 V 0  2V 0  V 0 2V | O<br>0 0 V  2V 0 0  V 2V |

DISPLAY DEVICE HAVING PLURAL GROUPS OF INTERCONNECTED SEGMENT ELECTRODES

BACKGROUND OF THE INVENTION

The present invention relates to a display device employing liquid crystals, and more particularly to a display unit having an increased operational margin attained through the manner in which electrodes thereof are interwired.

Prior liquid crystal display devices effect 3-line matrix display by way of dynamic scattering for successively selecting the lines. This type of liquid crystal drive has an operational margin $\alpha$ (the ratio of the effective value of a voltage impressed across a displayed segment to the effective value of a voltage impressed across a segment not displayed) which is of a small value, $\alpha \approx 1.9$. and hence has been incapable of driving a 3-line matrix of a guest-host type liquid crystals. The guest-host liquid crystal display requires an operational margin of at least 2.0.

Twisted nematic liquid crystals of general use operating with the foregoing operational margin suffer from the problems in that the temperature range in which the liquid crystals can be used is narrow, insufficient display contrast is achieved, and the response is slow.

SUMMARY OF THE INVENTION

It is an object of the present invention to provide a liquid crystal display device having a high operational margin for a 3-line matrix drive, as well as a high display contrast and a high response speed in a wide range of temperatures.

According to the present invention, segment groups each comprising at most three segments are arranged so as to never exhibit a display mode in which two out of the three segments in each respective group are rendered unresponsive and the remaining segment responsive, and segment electrodes of these three segments are electrically interconnected and disposed in confronting relation to different common electrodes for being driven by supplied voltages. The display unit of such a construction is capable of driving a 3-line matrix of guest-host liquid crystals which prior display units have been unable to do, and allows twisted nematic liquid crystals to operate in a wide temperature range and with an improved display contrast and response speed.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a table of voltages applied to the electrodes and statuses of the segments for various display modes on the display pattern of FIG. 1;

FIG. 10 is a view showing a variety of display modes on the electrode configuration illustrated in FIG. 9; and FIG. 11 is a table of still another example of drive voltages.

DESCRIPTION OF THE PREFERRED EMBODIMENTS

Figures 1, 2:
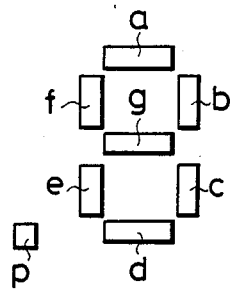
FIG. 1 is a view showing an example of a display pattern.
FIG. 2 is a table illustrative of statuses of segments for various display modes on the display pattern of FIG. 1.

The present invention will first be described with reference to an application to an electronic calculator or the like for numeric display. In such an application, a display pattern comprises, as shown in FIG. 1, seven segments a through g representative of numerals and a segment p indicative of a decimal point. These segments are selectively rendered responsive and unresponsive as shown in FIG. 2 to display one of the numerals 0 through 9 at any given time and a decimal point.

The segments a to g are arbitrarily divided into three segment groups wherein a first group comprises segments a, b and c, a second group comprises segments f, g and d, and a third group comprises segments e and p.

Considering two groups of segments, that is, the segments a, b, c, and the segments f, g, d, it can be seen from FIG. 2 that there is no display mode in which two segments are unresponsive and the remaining one segment responsive in each of these groups. In view of this, as can be seen in FIG. 3, segment electrodes Sa, Sb, Sc for the segments a, b, c, respectively, are electrically interconnected, segment electrodes Sf, Sg, Sd for the segments f, g, d, respectively, are electrically interconnected, and segment electrodes Se, Sp for the segments e, p, respectively, are electrically interconnected.

Three common electrodes COM1, COM2, COM3 are positioned so that the interconnected segment electrodes are disposed in confronting relation to different common electrodes, respectively, with liquid crystals filled between the segment and common electrodes.

Figures 3, 4:
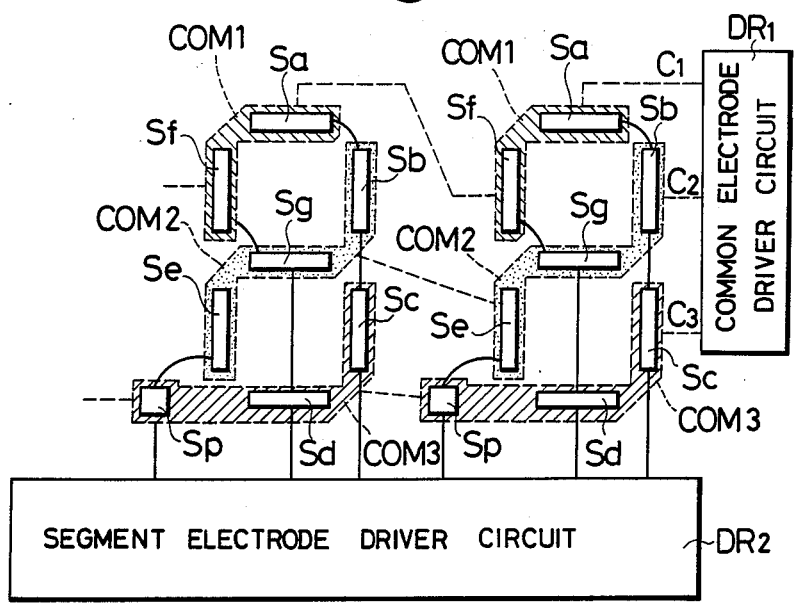
FIG. 3 is a view illustrating the pattern of electrodes and interconnecting wires for the segments of the display pattern shown in FIG. 1.
FIG. 4 is a table showing exemplary voltages applied to the electrodes.

With such wiring of the electrodes, voltages are applied to the common electrodes and segment electrodes in a pattern as illustrated in FIG. 4 for displaying all numerals with an increased operational margin. More specifically, a common electrode driver circuit $DR_1$ applies at all times a voltage $C_1$ (V, 3V, 3V, 3V, V, V) to the common electrode COM1, a voltage $C_2$ (3V, V, 3V, V, 3V, V) to the common electrode COM2, and a voltage $C_3$ (3V, 3V, V, V, V, 3V) to the common electrode COM3. A segment electrode driver circuit $DR_2$ selectively applies a voltage $S_1$ (0, 4V, 4V, 4V, 0, 0), a voltage $S_2$ (4V, 0, 4V, 0, 4V, 0), a voltage $S_3$ (4V, 4V, 0, 0, 0, 4V), a voltage $S_4$ (2V, 2V, 2V, 2V, 2V, 2V), or a voltage $S_5$ (0, 0, 0, 4V, 4V, 4V) to the segment electrodes. Therefore, the segment electrodes can be rendered responsive or unresponsive as desired and the combination of two segments being unresponsive and the remaining segment being responsive in any given group of three segments is avoided. Accordingly, all of the numerals 0 to 9 can be displayed since the segment electrodes are connected such that two out of three segments in each group will not be rendered unresponsive at the same time.

Since the effective voltage impressed across an unresponsive segment is $\sqrt{6}/6$ and the effective voltage applied across a responsive segment is $\sqrt{38}/6$, the operational margin is $\alpha = \sqrt{38/6} \approx 2.5$ which is much larger than the conventional operational margin $\alpha = 1.9$.

To display the numerals 0 through 9 and the decimal point, the voltages $S_1$ through $S_5$ as illustrated in FIG. 4 should be applied to the segment electrodes in a pattern as shown in FIG. 5. When the numeral 0, for instance, is to be displayed, the voltage $S_5$ is supplied to the segment electrodes Sa, Sb, Sc of the segments a, b, c, respectively, and the voltage $S_2$ is supplied to the segment electrodes Sf, Sg, Sd of the segments f, g, d, respectively, and the segment electrodes Se, Sp of the segments e, p, respectively, are supplied with the voltage $S_5$ or $S_1$ when the decimal point is to be displayed, and with the voltage $S_3$ when the decimal point is not to be displayed.

At this time, the voltages $C_1$, $C_2$, $C_3$ are impressed respectively on the common electrode COM1 for the segments a, f, the common electrode COM2 for the segments b, g, e, and the common electrode COM3 for the segments b, c, d, p. The segments a, b, c, f, d, e are rendered responsive while the segment g is rendered unresponsive, so that the numeral 0 is displayed. The segment P, or decimal point, is rendered responsive by the voltage $S_5$ or $S_1$ and unresponsive by the voltage $S_3$.

The other numerals can similarly be displayed by selectively applying the voltages $S_1$ through $S_5$.

Figure 6:
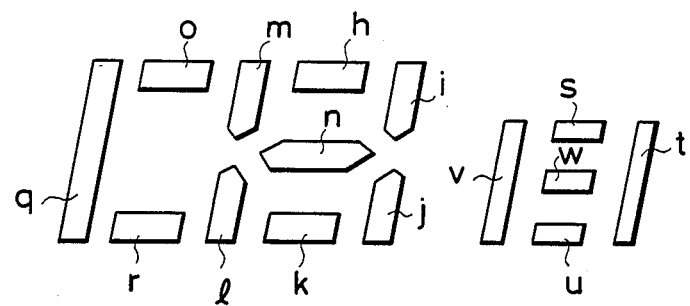
FIG. 6 is a view of another display pattern.
Figure 7:
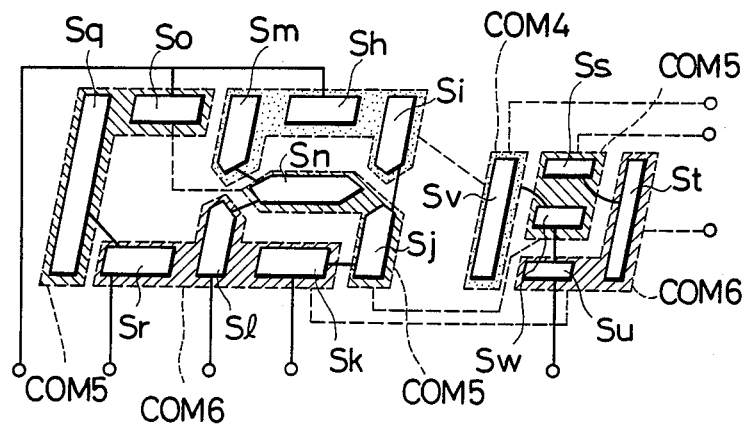
FIG. 7 is a view illustrating a pattern of electrodes and interconnecting wires for the segments of the display pattern shown in FIG. 6.

The display of days of the week will now be described. In FIG. 6, segments h through r are used for displaying the initials of the days, and segments s through w are used for displaying alphabetic letters following the initials. The segments are divided into segment groups, namely groups having segments i, j, k, segments l, m, n, segments u, v, w, segments o, h, segment r, q, and segments s, t. Since there is no display mode in which two segments are to be simultaneously rendered unresponsive in each group of three segments (i, j, k), (l, m, n), and (u, v, w), segment electrodes (Si, Sj, Sk), (Sl, Sm, Sn), and (Su, Sv, Sw), respectively, for the segment groups are electrically interconnected as shown FIG. 7. Segment electrodes (Sh, So), (Sq, Sr), and (Ss, St) are also electrically interconnected as shown in FIG. 7.

The interconnected segment electrodes are disposed in confronting relation to different common electrodes COM4, COM5, COM6, with liquid crystals interposed therebetween.

Figures 8, 9:
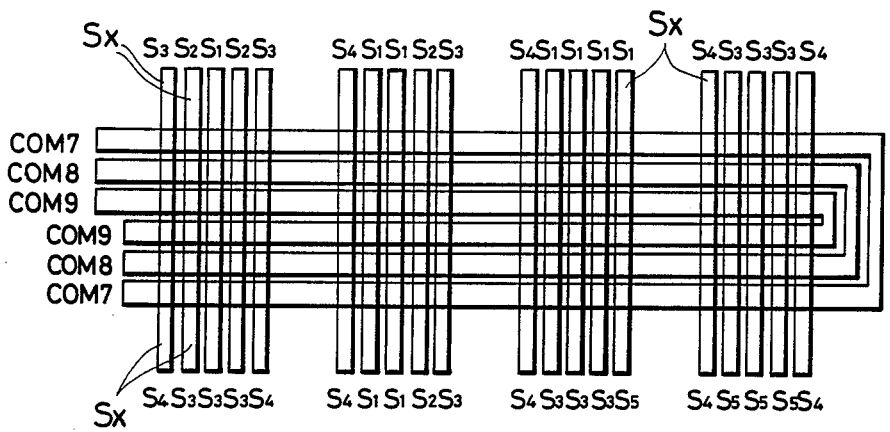
FIG. 8 is a table of voltages applied to the electrodes and statuses of the segments for various display modes on the display pattern of FIG. 6.
FIG. 9 is a view of a form of electrodes according to still another embodiment of the present invention.

The common electrodes COM4, COM5, COM6 are supplied at all times with voltages $C_1$, $C_2$, $C_3$, respectively, as in the previous embodiment. The segment electrodes are supplied selectively with the voltages $S_1$ through $S_5$ as shown in FIG. 8 to display the days of the week. To display Sunday, for example, the voltages $S_1$, $S_3$, $S_4$, $S_2$ are applied to the respective segment electrodes of the segments (i, J, k), (m, n, l,), (q, r), (h, o), and the voltage $S_2$ is applied to the respective segment electrodes of the segments (v, w, u), (s, t). The segments j, k, m, n, h are rendered responsive to display "S" of "Sunday" and the segments v, u, t are rendered responsive to display "u" following the "S".

Other days can similarly be displayed.

An embodiment in which alphabetic letters are displayed by a dot matrix will now be described. While in the foregoing two embodiments displays have been carried out by responsive segments, alphabetic letters are displayed by unresponsive segments in the following embodiment.

In FIG. 9, three common electrodes COM7, COM8, COM9 extend along bent paths and groups of five segment electrodes Sx are disposed in criss-cross relation to the common electrodes, providing 5×6 dot matrices. The common electrodes COM7, COM8, COM9 are supplied with the voltages $C_1$, $C_2$, $C_3$, respectively, at all times. For displaying alphabetic letters "A, D, F, H", the voltages $S_1$ through $S_5$ are impressed on the segments as illustrated in FIG. 9. Those segments which are shown hatched are rendered unresponsive for display, while the other segments are rendered responsive for nondisplay, thereby displaying the letters "A, D, F, H".

The other alphabetic letters can also be displayed in a similar manner as shown in FIG. 10. However, the alphabetic letters "B", "E", "G", "S", "Z" cannot be displayed since two out of three segments sharing one segment electrode are rendered unresponsive at the same time.

The voltages applied to the common and segment electrodes are not limited to those illustrated in FIG. 4. As an example, the three common electrodes may be supplied at all times with voltages (V, 0, 0, 0, V, 2V, 2V, 2V), (0, V, 0, 0, 2V, V, 2V, 2V), (0, 0, V, 0, 2V, 2V, V, 2V), respectively, and the segment electrodes may be selectively supplied with voltages (2V, 0, 0, 0, 0, 2V, 2V, 2V), (0, 2V, 0, 0, 2V, 0, 2V, 2V), (0, 0, 0, 0, 2V, 2V, 2V, 2V), (0, 0, 0, 2V, 2V, 2V, 2V, 0).

Since in the above example the effective voltage applied to an unresponsive segment is $\sqrt{2}/8$ and that to a responsive segment is $\sqrt{10}/8$, the operational margin becomes $\alpha = \sqrt{5} \approx 2.2$, which is smaller than the preceding example. However, the circuit arrangement is simple as only three voltages 0, V, 2V are utilized.

It should be noted that it is not intended to limit this invention to the drive voltages given in the above two examples.

Further, the display modes or patterns are not restricted to numerals and alphabetic letters.

With the arrangement of the invention, the display device has a high operational margin for 3-line matrix drive, the display device is capable of displaying characters with a high contrast for a wide temperature range, and the display device has a high response speed. The display unit of the invention is also capable of driving a 3-line matrix of guest-host liquid crystals which prior display units have failed to do. Accordingly, the present invention is highly contributive to a wide range of display applications.

Although certain preferred embodiments have been shown and described, it should be understood that many changes and modifications may be made therein without departing from the scope of the appended claim.

What is claimed is:

1. A display device comprising: a plurality of segments composed of a plurality of segment electrodes, an electrooptic display substance, and three common electrodes, said segment electrodes being divided into groups each having, at most, three segment electrodes interconnected electrically and disposed in confronting relation respectively to different common electrodes such that the three segments in each group can exhibit at most four possible display modes excluding display modes in which two of the three segments of any group are rendered unresponsive and the remaining one responsive; and driver circuit means for supplying different electric signals to the respective common electrodes and for selectively supplying a plurality of electric signals different from each of said first-mentioned electric signals to said segment electrodes dependent on the display mode to be displayed by said segments.

2. A display device comprising: at least one display unit comprised of plural segment electrodes disposed in a predetermined pattern, means electrically interconnecting the segment electrodes into separate segment electrode groups with at least one group having three electrically interconnected segment electrodes and no group having more than three electrically interconnected segment electrodes, three common electrodes disposed in opposed spaced-apart relation from the segment electrodes and arranged so that the respective segment electrodes in each group are opposed to a different one of the common electrodes, and electrooptic material sandwiched between the segment and common electrodes; drive circuit means for supplying electric drive signals of at least two voltage levels to the respective common electrodes and for selectively supplying electric drive signals of at least two voltage levels to the segment electrodes to cause the respective pairs of opposed segment and common electrodes to exhibit either display or non-display modes; and wherein each group of three segment electrodes has the segment electrodes thereof electrically connected to exhibit at most four different display modes excluding display modes in which two of the three segment electrodes are in a non-display mode and the third segment electrode is in a display mode.

3. A display device according to claim 2; wherein the drive circuit means supplies electric drive signals of only three different voltage levels to the segment and common electrodes.

4. A display device according to claim 3; wherein the display device has a plurality of similar display units.

5. A display device according to claim 2; wherein the drive circuit means supplies electric drive signals of only five different voltage levels to the segment and common electrodes.

6. A display device according to claim 5; wherein the display device has a plurality of similar display units.

7. A display device according to claim 2; wherein the drive circuit means supplies electric drive signals to the segment and common electrodes such that the ratio of the effective voltage impressed across each pair of opposed segment and common electrodes exhibiting a display mode to the effective voltage impressed across each pair of opposed segment and common electrodes exhibiting a non-display mode is greater than 2.0.

8. A display device according to claim 7; wherein the said ratio is approximately 2.2.

9. A display device according to claim 7; wherein the said ratio is approximately 2.5.

10. A display device according to claim 2; wherein the drive circuit means includes means for supplying the electric drive signals to the segment and common electrodes to drive the display unit in a static multiplex drive mode.

* * * * *